Patented Apr. 26, 1949

UNITED STATES PATENT OFFICE 2,468,086

PROCESS OF RENDERING ANIONIC COATING MATERIALS ADHERENT TO ANIONIC BASES

Henry H. Latham and Joseph R. Morton, Greensboro, N. C., assignors to Morton Chemical Company, Greensboro, N. C., a corporation of North Carolina No Drawing. Application June 21, 1948, Serial No. 34,357

12 Claims. (Cl. 117—56)

This invention relates to an improved process of impregnating and coating base materials having anionic activity, such as fibres, fabrics and synthetic plastics. Typical of the fibres with which the present invention is concerned are vegetable fibres, notably cotton, flax, ramie, sisal, and, in fact, all types of cellulosic fibres including wood fibres and paper pulp. Also, the invention is applicable to animal fibres, such as wool, hair, and silk. In addition to vegetable and animal fibres, the invention is useful upon glass fibres and fibres prepared synthetically or chemically, such as nylon, rayon, "Vinyon," which is a copolymer of 88 to 95% vinyl chloride and 5 to 12% vinyl acetate, protein, etc. Knitted and woven fabrics prepared from any of the above fibres or mixtures thereof can be treated by the present invention, as well as fabrics prepared by felting, such as paper or laminated felt structures. Moreover, the invention is useful in connection with films prepared from filming materials, such as typified by vinyl chloride, vinylidene chloride, styrene-butadiene, nylon, cellulose acetate, and cellulose acetate butyrate.

The impregnating and coating materials employed are customary commercial products which exhibit or can be made to exert anionic activity. Examples are natural and synthetic rubber and their latices, natural resins, such as rosin, dammar and kauri, and synthetic resins typified by phenol formaldehyde resins, urea formaldehyde resins, alkyd resins, polyvinyl chloride and polyvinyl acetate and their conjoint polymerization products, vinylidene chloride, polymerization products of vinylidene chloride with either vinyl chloride or vinyl acetate, acrylic and polymeric methacrylic acid esters, e. g., methyl methacrylate resins, melamine formaldehyde resins, polystyrenes, ketone formaldehyde resins, polyethylene, thiokol, butadience copolymers with styrene, acrylonitrile, butyl rubber, polyisobutylene, polymerized chlorobutadiene, etc., as well as resins of the proteinous types, e. g., protein formaldehyde resins, and innumerable other resins, as well as pigments or dry color aqueous dispersions, aqueous resin dispersions containing pigments or fillers and aqueous dispersions of organic colors.

In fact, any base material and any coating or impregnating material may be employed, where the same are or may be negatively charged, i. e., exert anionic activity. Preferably, and usually, the coating or impregnating substance is used in the form of aqueous emulsions and dispersions of the same, and with or without the use of customary dispersing and wetting agents. The term "emulsion" as used herein and in the claims is intended to cover aqueous bodies which contain liquids or solids in suspension therein in the inner phase, i. e., dispersed in the aqueous outer or continuous phase.

The object of the present invention is to increase the adhesion of the coating or impregnating materials to the base, whereby there is imparted to the final product enhanced resistance to abrasion and the possibility of peeling of the applied coating or impregnant from the base is substantially reduced. Also, it is an object of the invention to increase the pick-up, i. e., the amount of coating and impregnating materials which will adhere to the base.

We have found that the improved results are obtained by treating the base prior to coating or impregnating with a cationic active agent prepared by reacting a member of the group consisting of alkyl sulphates, phosphates (preferably the triphosphate) and halides with an organic unsaturated compound made by condensing an alkylene polyamine with an acid selected from the group consisting of fatty acids containing 6 to 20 carbon atoms, monohydroxy substituted fatty acids containing 6 to 20 carbon atoms, dicarboxylic acids containing 4 to 10 carbon atoms and tall oil which latter is a product containing a mixture of fatty acids and rosin acids recovered from the black liquor derived from the treatment of wood fibre by the kraft process. In the polyamine-acid reaction, the resultant soap is dehydrated and the dehydrated amide which is an aliphatic, alklene polyamide is then alkylated to produce a dehydrated aliphatic, alkylated, alkylene polyamide. We observed that the extent of cationic activity was related to amount of water removed during the amidation step. That is, it was found that if the amidation step was not carried to completion, the final alkylated product was not as cationcally active as when all the water was removed, because alkylation did not proceed as fast or as completely, unless substantially all water was taken off during the amidation. For instance, it was found that a much stronger cation active compound could be produced by distillation of all of the water from the product during the amidation, thereby giving an anhydrous intermediate which could be ethylated in such a manner that both ethyl groups were bonded during the reaction.

Examples of suitable alkylene polyamines are straight chain alklene polyamines having the general formula $H_2N(C_2H_4NH)_xC_2H_4NH_2$ wherein $x$ is 1 to 41, such as triethylene tetramine, tetraethylene pentamine, diethylene triamine and polyethylene amines having an approximate or average molecular weight of 1200 to 1800 which are straight chain ethylene amines polymerized to a point at which the ethylene amine grouping is continued, i. e., in straight chain until a molecular weight of 1200 to 1800 is produced. These latter compounds have primary terminal amine groups and secondary internal amine groupings and are typified by the above formula. Also, suitable examples are straight chain alkylene polyamines having the formula $$H_2N(C_3H_6NH)_xC_3H_6NH_2$$

wherein $x$ is 1 to 2, such as dipropylene triamine and tripropylene tetramine. In addition, other suitable examples of alkylene polyamines are derived from 1,3-butane diamine, being a polyamino hydrocarbon with 4 carbon atoms between nitrogen atoms plus 1 extra amino group on each group of 4 carbon atoms and having an approximate or average molecular weight of 185 and showing an average of 2.6 nitrogen atoms per mol of polymer, the amino groups being divided about one-half primary and one-half secondary, 20% of the compound boiling below 210° C. and 70% boiling below 280° C. In carrying out the invention one or a mixture of any of the foregoing polyamines may be employed.

Suitable fatty acids, are the fatty acids of coconut oil, and, in fact, any fatty acid or mixture of fatty acids, saturated or unsaturated, having from 6 to 20 carbon atoms in the chain, e. g., caproic acid, arachidic acid, and oleic, stearic, palmitic, myristic, lauric, hydroxy substituted fatty acids, linoleic, linolenic, and mixed acids resulting from the splitting of the glycerides of the commonly available fats and oils, such as coconut, castor, cottonseed, soya, and tallow. Also, hydroxy substituted fatty acids, such as ricinoleic acid may be used. In addition to the straight chain fatty acids, dicarboxylic saturated and unsaturated acids having 4 to 10 carbon atoms may be used, notably sebacic acid, adipic acid, maleic acid, succinic acid, and suberic acid. Also, tall oil, as above mentioned, may be employed. In carrying out the invention, one or a mixture of any of the aforesaid acids may be used.

For the purposes of alkylation, dimethyl, diethyl or dipropyl sulphate or the mono, di or tri methyl, ethyl and propyl phosphates may be used; also alkyl halides, such as methyl, ethyl or propyl chlorides, or bromides, namely, the mono and di-chlorides and bromides may be employed. Mixtures of the alkylating agents may be used.

We have discovered that a further satisfactory cationic active agent is prepared by alkylating the product obtained when 2 mols of any of the amidation products formed herein are reacted with 1 mol of urea to an amount of urea which is 1 mol less than the total number of nitrogen atoms present in the alkylene polyamine used in forming the amidation product. The reaction is carried out by reacting the amide and the urea at temperatures not in excess of 190° C. and not less than 75° C. in an open or closed system.

We have found that when the base is first treated with a cationic coupling agent prepared by the reactions above described, subsequent coating of the base is achieved in a manner to produce a marked increase in the amount of coating material picked up by the base per unit area thereof, and, moreover, the adherence and abrasion resistance of the coating or impregnant is substantially enhanced.

Example 1

A suitable cationic coupling agent is prepared by mixing 1 mol of the mixed fatty acids of cocoanut oil with 1 mol of diethylene triamine, and reacting the same in a closed still at about 123° C. until at least 1 mol water has been distilled over. Temperatures from 120° C. to 200° C. are suitable. With vacuum, lower temperatures are possible. The dehydrated resultant product was reacted with 1 mol of dimethyl sulphate at 130° C. to 200° C., for instance, at a temperature of about 180° C. until maximum cationic activity was obtained. This required approximately one hour after the initial temperature rise occasioned by the violent reaction of the dimethyl sulphate with the dehydrated amide. The product was then diluted with water to about 40% active ingredients yielding a water soluble, light yellow, viscous liquid which was successfully used in the following examples on a fibrous base and a fabric base. The dilution, of course, may be carried out to any desired concentration and is done primarily to facilitate ease in handling.

Instead of the fatty acids from cocoanut oil, any fatty acid or mixture of fatty acids, saturated or unsaturated, having from 6 to 20 carbon atoms in the chain, as indicated above, may be employed. Instead of the diethylene triamine any of the polyamines mentioned herein or mixtures thereof may be used. The amidation product may be condensed with urea as above-described and then alkylated.

Example 2

The procedure of Example 1 is followed in the case of hydroxy substituted fatty acids, such as ricinoleic acid, with the same results.

Instead of 1 mol of the fatty acid in the foregoing examples, more than 1 mol may be used, e. g. 2 mols. Where 2 mols of the fatty acid are used, 2, 3 or 4 mols of water may be removed.

The production of an anhydrous amide is preferable, but, in some cases, where a weak cationic agent is desired, conditions which produce less than the anhydrous state of Examples 1 and 2 may be used, i. e., where less than 1 mol of water is removed. Preferably, at least 1 mol of water is removed in order to accomplish efficient alkylation.

Example 3

A suitable cationic coupling agent is prepared by mixing 1 mol of lauric acid with 1 mol of polyalkylene polyamine which is a straight chain polymerization product of ethylene amine having two terminal primary amine groups and a multiplicity of secondary amine groups and having the average molecular weight of 1200 and of the general formula $H_2N(C_2H_4NH)_xC_2H_4NH_2$, then reacting in a closed system at 140° C. until at least 1 mol of water has been distilled off. Temperatures of 120° C. to 200° C. are suitable. With vacuum, lower temperatures are possible. The resulting amide is reacted with 1 mol of diethyl sulphate at 130° C. to 200° C., for instance, at a temperature of 180° C. until maximum cation activity is obtained. This required approximately 90 minutes after the initial temperature rise which was evident at the addition of the alkylating agent. The product was diluted with water to 40% active ingredients yielding a water soluble viscous liquid which was successfully used to increase the pick-up and retention of resin on cotton goods, as will be shown.

Example 4

A suitable cationic active coupling agent is prepared by substituting for the 1200 molecular weight polyamines in the foregoing Example 3, a polymerization product of the same general formula and having an average molecular weight of 1800.

Example 5

A suitable cationic active coupling agent was prepared in the same manner as the foregoing Example 3 by substituting for the 1200 or 1800 molecular weight polyamines, a polymer derived from 1,3-butane diamine, being a polyamino hydrocarbon with 4 carbon atoms between nitrogen atoms plus 1 extra amino group on each group of 4 carbon atoms and having a molecular weight of 185. The amino groups are divided about one-half primary and one-half secondary and average about 2.6 nitrogen atoms per mol of the compound, 20% of the compound boiling below 210° C. and 70% boiling below 280° C.

Example 6

A suitable cationic active material has been prepared as in Examples 1 to 5 except that after the amidation step, 2 mols of the amide are reacted in a closed system between 110° C. and 190° C. with 1 mol of urea, yielding a product of the general formua

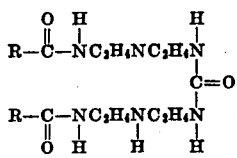

where R is aliphatic straight chain and derived from the fatty acids.

One mol of the above product is then alkylated with 1 mol of diethyl sulphate at 130° C. to 200° C. until maximum cation activity is obtained. The product may then be cut to 40% active ingredients with water yielding a water soluble viscous mass.

It is to be understood, of course, that any of the polyamines mentioned herein and mixtures thereof, any of the fatty acids mentioned herein and mixtures thereof, and any of the alkylating agents and mixtures thereof may be employed in the foregoing examples. Likewise, the amidation products can be condensed with urea as above described and thereafter alkylated.

The following examples illustrate the reactions where a dicarboxylic acid is reacted with any of the polyamines mentioned herein or mixtures thereof, and the amidation product then condensed or alkylated with one of the alkylating agents above described to produce aliphatic, alkylated, alkylene polyamides and their dehydration products.

Example 7

A suitable cationic coupling agent is prepared by mixing 1 mol of sebacic acid with 1 mol of tetraethylene pentamine and reacting in a closed still at temperatures from 120° C. to 200° C., for instance 123° C. until at least 1 mol of water had been distilled over. The resultant dehydrated product was reacted with 1 mol of diethyl sulphate at a temperature of about 180° C. until maximum cationic activity was obtained. This ethylation reaction may be carried out between 130° C. and 200° C. However, at 180° C. the reaction required approximately one hour after the initial temperature rise occasioned by the violent reaction of diethyl sulphate with the dehydrated amide. The product was then diluted with water to about 40% active ingredients yielding a water-soluble viscous liquid which was successfully used in the bonding of synthetic or natural resin to a negatively charged fibrous or fabric base. The dilution of this product may be carried out to any desired concentration, and is done primarily to facilitate ease in handling.

Example 8

The procedure of Example 7 is repeated, but using maleic, adipic, suberic or succinnic acid.

Example 9

The procedure of Examples 7 and 8 was repeated condensing until at least 2 mols of water are removed and then alkylating.

Example 10

The procedure of Examples 7 and 8 was repeated condensing until at least 3 mols of water are removed, and then alkylating.

Example 11

The procedure of Examples 7 and 8 was repeated using 2 mols of the polyamine, removing at least 2 mols of water, and then alkylating.

Example 12

The procedure of Examples 7 and 8 was repeated using 2 mols of the polyamine, removing at least 3 mols of water, and then alkylating.

Example 13

The procedure of Examples 7 and 8 was repeated using 2 mols of the polyamine, removing at least 4 mols of water, and then alkylating. In this example, the alkylation was accomplished with 2 mols of diethyl sulphate.

Example 14

The procedure of Examples 7 and 8 was repeated using 2 mols of the dicarboxylic acid with 3 mols of the polyamine, and removing 4 mols of water. As much as 6 mols of water can be removed, and a successful product formed. The amine was alkylated with 1, 2 and 3 mols of diethyl sulphate, respectively.

Example 15

The procedure of Example 14 was repeated using 3 mols of the acid to 4 mols of the amine, and removing 6 to 8 mols of water, and then alkylating with 1, 2 and 3 mols of diethyl sulphate, respectively.

Example 16

The procedure of Example 15 was repeated using 4 mols of the acid to 5 mols of the amine and removing 8 to 10 mols of water. The alkylation was accomplished with 1, 2 and 3 mols of diethyl sulphate, respectively.

Example 17

The procedures described in Examples 7 to 16 are employed with the procedure set forth in Example 6, followed by alkylation, as in Example 6.

Amides obtained as a result of the condensation reaction of the polyamine with the acid, may be described as organic unsaturated compounds having an aliphatic straight chain containing from 6 to 20 carbon atoms in the case of the fatty acid reaction, and 4 to 10 carbon atoms in the case of the dicarboxylic acid reaction, bound to one of a plurality of reactive nitrogen atoms of an alkylene polyamine or generically recited, are aliphatic, alkylene polyamides and their dehydration products. In all of the foregoing examples, 1 mol of the amidation product is obtained. These condensation products are further reacted with one or more mols of one or a mixture of the alkylating agents, above-described, whereby there is coupled to the amide an anion selected from the group consisting of sulphate, phosphate, and halogen ions to give alkylation products of the polyamide and its dehydration products. We prefer as the alkylating agent diethyl sulphate, but any of the other agents or mixtures thereof may be used.

All of the amides and dehydration products thereof obtained from Examples 1 to 12 demonstrated satisfactory cationic properties which increased with the amount of dehydration of the amidation product of the reaction between the polyamine and the acid.

The following examples illustrate the use of the reaction products of Examples 1 to 12 in connection with fibres, fabrics, and films, the procedure being the same in all cases.

Example 18

A skein of No. 40, 2-ply cotton yarn was wound on a reel, and thereafter impregnated by passing through an aqueous bath containing 3% of the cationic coupling agent of Example 1, above-indicated. Of course, other of such agents or mixtures thereof may be used.

The temperature of the bath was 130° F. The inclusion of a cationic active wetting agent in the bath was preferable, but optional. The contact of the yarn with the bath was about two seconds. The skein was then bone-dried and weighed. The weight was 1.5593 grams. Thereafter, the skein treated with the cationic coupling agent was passed through a bath of an aqueous emulsion of GRS, type 2, latex, the yarn being in contact with the bath for about two seconds, and thereafter passed through a squeeze roll and dried to a bone dry condition. Upon being weighed, it was found that the yarn had picked up .3329 gram of the latex solids which produced about 75% + increase in the weight over yarn treated in the conventional manner, and, of course, indicating a very substantial pick-up of latex solids.

Example 19

Strips of 6 oz. cotton duck were treated in the same manner as the yarn in Example 18 to impregnate the same with the cationic coupling agent. The strips were ironed dry to simulate hot calendering. It is well known that cotton duck resists pick-up of latex or resin-color emulsions where calendered before the coating treatment.

In the present example, the cotton duck impregnated with the cationic coupling agent was coated with an aqueous emulsion of vinyl chloride and vinylidene chloride co-polymer by one pass of a laboratory knife blade coater which simulates normal mill procedure. There was a considerable pick-up of the resin emulsion, and the resultant product had the appearance of multiple coats, yet was smooth and showed no resistance in spots after the single pass of the knife blade. Following fluxing, i. e., fusing the coating and drying, it was found that the product could be roughed up by abrading two surfaces of the coating together without effecting the peeling-up of the film away from the fabric base. Moreover, the film did not have a tendency to crack, although creased up to angles of 180°, and under substantial abrasion, indicated much better than normal wearing characteristics. These advantageous results were observable with the coated yarn of Example 18, and also where the procedure was carried out on a synthetic film or fibre, notably, cellulose acetate or nylon.

In the previous Examples 18 and 19, while we have indicated the coating and impregnating material as being GRS, type 2, latex, and a vinyl chloride-vinylidene chloride copolymer, respectively, similar results were obtained with other of the coating and impregnating materials above-described. Examples 18 and 19 are instances where the coating material is an aqueous dispersion or emulsion of solid particles in an aqueous outer or continuous phase, i. e., solid particles are suspended in the outer aqueous phase. Instead of solid particles, the coating material may consist of an emulsion or dispersion of liquid particles suspended in the outer or continuous aqueous phase, as when an aqueous emulsion of polystyrene is prepared in the customary manner.

It is, of course, understood that any of the film-forming or coating materials described above may be utilized in carrying out the invention in accordance with Examples 18 and 19.

Example 20

A skein of No. 40, 2 ply cotton yarn was treated as in Example 18 except that the resin used was a polyvinyl chloride aqueous emulsion in which had been dispersed a pigment color such as "Toluidine Red." The yarn was then dried and found to have acquired a good adsorption of the resin and color and that the color was fast to crocking and washing.

Example 21

Strips of cotton tape were cut from the same lot and dried to constant weight as follows:

A _____ 10.005
B _____ 10.150
C _____ 10.103
D _____ 9.985

Tape A was impregnated by 15 minute soaking at 25° C. in 100 grams of 0.5% solution of cationic active agent of Example 3. The treated tape was then rinsed to remove all uncombined cationic active material. It was then air dried and impregnated by 15 minute soaking in an anion active emulsion of polystyrene containing 25% solids, then rinsed and run through a squeeze roll of known pressure. The tape was dried to constant weight and found to have picked up 28.9% of its original weight.

Tape B was impregnated with the cationic active product of Example 4 in a manner similar to above and thereafter treated as in the case of tape A. Results showed a pick-up of 30.1% resin.

Tape C was impregnated with the cationic active product of Example 5 in a manner similar to tapes A and B. Results showed a pick-up of 20% of resin solids.

Tape D was impregnated with the cationic active agent of Example 6 in a similar manner as tapes A, B and C. Results showed a pick-up of 21% of resin solids.

While the examples illustrate use of the invention on vegetable yarn or fibres, and on fabrics of vegetable fibre, the procedures for treating animal fibres and chemically prepared fibres or films or fabrics prepared from such fibres or films is the same, and the result were equally improved both as regards adherence, abrasion resistance, and pick-up of coating material.

The effectiveness of the present invention, as illustrated by Examples 18 and 19, resides in treating the base, e. g., fibres, fabrics, or films with a cationic compound of the character described herein which is sufficiently reactive (1) to neutralize the anionic activity of the base, and applying to the base so treated an anionic coating or impregnating material, the cationic agent (2) having sufficient remaining activity to neutralize the anionic activity of the coating or impregnating material. By this process, a better pick-up, i. e., a greater amount of the coating material or impregnant is applied to the base, and the same is more firmly bonded to the base by the ionic activity of the cationic agent respectively with the base and the coating or impregnant, whereby markedly improved adherence is obtained and the abrasion resistance of the coated base is substantially improved.

The present invention lends itself particularly to the production of tire cord, as well as fabric treatment, with latex emulsions, either clear or pigmented, in that the tendency of such base materials to resist latex or resin emulsions is overcome by the cationic treatment and a better pick-up and stronger adherence is thus obtained. The same is true in connection with the treatment of nylon fibre and nylon hose, in that the cationic treatment prior to impregnation in a bath of latex improved substantially the snag resistance of the nylon hose.

Also, it has been determined that by the cationic treatment of cloth prior to pigment printing or organic color printing from oil-in-water type emulsion, an increase in resistance to abrasion, crocking, and better wash-fastness is obtained.

In the appended claims, the term "coating" is used to cover both coating and impregnating.

The term "nylon," as used herein, is intended to cover its generally accepted meaning, namely, any long chain synthetic polymeric amide which has recurring amide groups as an integral part of the main polymer chain, and which is capable of being formed into a filament in which the structural elements are oriented in the direction of the axis.

The term "rayon," as used herein, likewise, is intended to cover its generally accepted meaning, namely, manufactured textile fibre or yarn produced chemically from cellulose or with a cellulose base and thread, strands or fabrics made therefrom regardless of whether such fibre or yarn be made under the viscose, acetate, cupra-ammonium, nitrocellulose or other process.

This application is a continuation-in-part of our United States application Serial No. 793,330, filed December 22, 1947 now abandoned.

We claim:
1. The method of coating an anionic active solid base comprising coating the same with an aqueous solution of a cationic active compound made by reacting 1 to 3 mols of a member of the group consisting of alkyl sulphates, phosphates and halides having 1 to 3 carbon atoms in an alkyl group with a dehydrated amidation product made by condensing in the presence of heat 1 to 5 mols of a compound selected from the group consisting of straight chain alkylene polyamines having the general formula

$H_2N(C_2H_4NH)_xC_2H_4NH_2$

wherein $x$ is 1 to 41; the general formula $H_2N(C_3H_6NH)_xC_3H_6NH_2$

where $x$ is 1 or 2; and an alkylene polyamine derived from 1,3-butane diamine, being a polyamino hydrocarbon with 4 carbon atoms between nitrogen atoms plus one extra amino group on each group of 4 carbon atoms, having an average molecular weight of 185 and showing an average of 2.6 nitrogen atoms per mol, the amino groups being divided about one-half primary and one-half secondary, 20% of the compound boiling below 210° C. and 70% boiling below 280° C., with 1 to 4 mols of an acid selected from the group consisting of tall oil acids, fatty acids containing 6 to 20 carbon atoms, monohydroxy substituted fatty acids containing 6 to 20 carbon atoms, and dicarboxylic acids containing 4 to 10 carbon atoms until 1 to 10 mols of water are distilled off, and coating the base so treated with a film-forming anionic active material in aqueous emulsion, said cationic compound being sufficiently reactive to neutralize the anionic activity of the film-forming material whereby the latter is firmly bonded to the base by the ionic activity of said cationic compound respectively with the base and film-forming material.

2. The method according to claim 1 wherein, before alkylation, the amidation product, which is the reaction product of the polyamine and the acid, is reacted in the proportion of 2 mols of amidation product to 1 mol of urea to a quantity of urea which is 1 less mol of urea than there are nitrogen atoms present in the alkylene polyamine used in forming the amidation reaction product, the reaction between the amidation product and the urea being carried out at temperatures not in excess of 190° C. and not less than 75° C.

3. The method according to claim 1 wherein the polyamine has the general formula $H_2N(C_2H_4NH)_xC_2H_4NH_2$

wherein $x$ is 1 to 41.

4. The method according to claim 1 wherein the polyamine is tetraethylene pentamine.

5. The method according to claim 1 wherein the polyamine is diethylene triamine.

6. The method according to claim 1 wherein the polyamine is triethylene tetramine.

7. The method according to claim 1 wherein the fatty acid is a mixture of cocoanut oil fatty acids.

8. The method according to claim 1 wherein the fatty acid is tall oil acids.

9. The method according to claim 1 wherein the dicarboxylic acid is sebacic acid.

10. The method of coating an anionic active solid base comprising coating the same with an aqueous solution in accordance with claim 1 and wherein the said acid, polyamine and alkylating member are used in equi-molecular proportions and the condensing is carried on until 1 mol of water is distilled off.

11. The method of coating an anionic active solid base comprising coating the same with an aqueous solution in accordance with claim 1 and wherein the said acid, polyamine and alkylating member are used in equi-molecular proportions and the condensing is carried on until 1 mol of water is distilled off and wherein the fatty acid is a mixture of cocoanut oil fatty acids, the polyamine is tetraethylene pentamine and the alkylating member is diethyl sulphate.

12. The method according to claim 1 wherein the anionic active solid base is cellulosic fibre.

HENRY H. LATHAM.
JOSEPH R. MORTON.

No references cited.